United States Patent [19]

Igashira et al.

[11] Patent Number: 4,635,849
[45] Date of Patent: Jan. 13, 1987

[54] PIEZOELECTRIC LOW-PRESSURE FUEL INJECTOR

[75] Inventors: Toshihiko Igashira, Toyokawa; Yasuyuki Sakakibara, Nishio; Seiko Abe, Okazaki; Masahiro Takigawa, Nukata; Akihiro Izawa, Nishio, all of Japan

[73] Assignee: Nippon Soken, Inc., Nishio, Japan

[21] Appl. No.: 729,144

[22] Filed: Apr. 30, 1985

[30] Foreign Application Priority Data

May 3, 1984 [JP] Japan .................... 59-89975
Jun. 5, 1984 [JP] Japan .................... 59-116259

[51] Int. Cl.$^4$ .................... B05B 3/14; B05B 1/30; F16K 31/08; F16K 15/00
[52] U.S. Cl. .................... 239/102.2; 239/533.3; 239/533.12; 239/533.13; 137/516.17; 137/854; 251/65
[58] Field of Search ............... 239/102, 453, 456, 499, 239/533.1, 533.2, 533.3, 533.12, 533.13, 533.14; 137/854, 516.17; 251/65

[56] References Cited

U.S. PATENT DOCUMENTS

| | | | |
|---|---|---|---|
| 1,326,923 | 1/1920 | Frech | 137/516.17 |
| 2,088,007 | 7/1937 | Zumbusch | 239/533.12 X |
| 2,749,181 | 6/1956 | Maxwell et al. | 251/65 X |
| 2,774,375 | 12/1956 | Bernat et al. | 251/65 X |
| 2,966,351 | 12/1960 | Scholz | 251/65 X |
| 3,066,856 | 12/1962 | Frank | 137/854 X |
| 3,194,162 | 7/1965 | Williams | 103/1 |
| 3,228,418 | 1/1966 | Rosback et al. | 137/854 X |
| 3,540,470 | 11/1970 | Schmid | 137/516.17 |
| 4,079,762 | 3/1978 | Hanson, Jr. | 239/453 X |
| 4,489,754 | 12/1984 | Seessle | 251/65 X |

FOREIGN PATENT DOCUMENTS

27992  5/1903  Switzerland .................... 137/854

Primary Examiner—Joseph F. Peters, Jr.
Assistant Examiner—Patrick N. Burkhart
Attorney, Agent, or Firm—Cushman, Darby & Cushman

[57] ABSTRACT

A piezoelectric fuel injector for use in fuel injection systems of spark-ignition engines is provided with a normally closed valve assembly in the form of a reed valve. The valve assembly includes a valve plate having one or more outlet ports having an overall cross-sectional flow area sufficient to ensure an unobstructed flow path therethrough. The valve assembly also includes a generally flat, thin, resilient closure member cooperating with the valve set of the valve plate. The pressure wave created in the fuel in the pumping chamber upon excitation of the piezoelectric actuator propagates into the outlet ports to directly reach the thin closure member, which readily resiliently yields to permit a desired amount of fuel to be injected into the engine cylinders. The fuel injector is particularly suitable to be operated by a high-frequency drive signal in order to ensure precise metering of fuel quantity over a wide range of engine operating conditions.

17 Claims, 9 Drawing Figures

PIEZOELECTRIC LOW-PRESSURE FUEL INJECTOR

BACKGROUND OF THE INVENTION (1) Field of the Invention

The present invention relates to improvements in a piezoelectric fuel injector for use in spray-injecting injecting a metered amount of low-pressure fuel, such as gasoline, into an intake air stream drawn into the cylinders of a spark-ignition internal combustion engine. More particularly, the present invention relates to the fuel injector of the nature described which is operable at a high frequency in response to a high frequency drive signal in order to ensure precise metering of the quantity of fuel throughout a wide range of engine operating conditions.

(2) Description of the Related Art

It is well known to use piezoelectric actuators for pumping and metering fuel in fuel injectors. An example of the prior art piezoelectric fuel injectors is disclosed in U.S. Pat. No. 3,194,162 granted to A. L. W. Williams. This fuel injector is provided with a piezoelectric drive unit associated with a piston. The injector has an outlet passage which is in the form of a horn normally closed by a spring-biased pintle valve. When the piezoelectric drive unit is excited causing sudden movement of the piston, a shock wave is imparted to the fuel stored in the horn. As the shock wave advances in the horn, the fuel pressure is increased, causing the pintle valve to give way, thereby allowing a small quantity of fuel to be injected into the engine cylinder. Williams anticipates the use of his injectors for to diesel engines as well as spark-ignition engines.

Contemporary spark-ignition engines are often provided with electronically-controlled fuel injection systems equipped with low-pressure fuel injectors, as opposed to high-pressure fuel injector used in diesel engines. In spark-ignition engines, demands for fuel per unit time interval vary significantly from the minimum quantity required during engine idling up to about 50 times the minimum required during full-throttle high-speed operation. This variation in fuel demand is even greater in turbocharged engines The essential requirement for low-pressure fuel injectors is that they be capable of metering the quantity of fuel as precisely as possible over a wide range of engine operating conditions.

When a piezoelectric fuel injector such as that proposed by Williams is used in electronically-controlled fuel injection systems, metering of fuel may be achieved by controlling the voltage applied to the piezoelectric element, thereby varying the amount of expansion of the element in such a manner as to in turn vary the distance of travel of the piston and, hence, the displacement of the piston for each pumping stroke. Alternatively, or in combination with the voltage variation, the control of quantity of fuel may be effected by changing the number of actuations of the piezoelectric actuator per unit time interval as disclosed in a copending U.S. patent application Ser. No. 549,372 filed November 7, 1983 and assigned to the assignee of the present invention. In the latter case, the frequency of operation of the piezoelectric drive, i.e., the number of operations per unit time interval, must be varied from the minimum value to the maximum in order to meet the wide variation in the fuel demand mentioned above.

One of the disadvantages of conventional piezoelectric fuel injectors such as that of Williams is that the quantity of fuel injected per unit time interval is not increased in proportion to, or in a linear relationship with, the increase in the frequency of operation, particularly in the high-frequency operation of the piezoelectric drive unit, so that precise metering function is not achieved during high-speed operation. This is because the quantity of fuel injected per pumping stroke fluctuates considerably at the high-frequency operation.

Another disadvantage of the prior art piezoelectric fuel injectors is that the outlet passage leading from the pumping chamber must be made as a narrow opening for being closed by the pintle valve. The reduction in the cross-sectional area of the outlet necessarily entails that the fuel be injected in a relatively thick layer through the annular clearance between the outlet opening and the pintle valve in order to achieve the required amount of fuel injection. This tends to result in insufficient subdivision and vaporization of fuel droplets. This prevents even distribution of the air/fuel mixture over different cylinders, particularly when the fuel injection system is of the single-point type wherein only one injector is provided for supplying fuel for all cylinders.

SUMMARY OF THE INVENTION

The general object of the present invention is to eliminate the aforementioned disadvantages.

The primary object of the present invention is to provide a piezoelectric fuel injector particularly suitable to be operated at a high frequency yet perform a precise metering function.

Another object of the present invention is to provide a piezoelectric fuel injector capable of delivering a predetermined precise amount of fuel in each injection stroke throughout a wide range of frequencies of operation.

Still another object of the present invention is to provide a piezoelectric fuel injector capable of atomizing the injected fuel to a profound degree.

This invention is based on the discovery that the irregularity in the quantity of fuel injection experienced in the fuel injector of Williams during high-frequency operation is due to secondary, tertiary, or subsequent injections taking place upon each excitation of the piezoelectric drive. That is, since the horn is tapered toward a narrow outlet, the quantity of fuel delivered out of the injector on the initial pressure rise in each pumping stroke of the piston is limited so that part of the shock wave produced by the sudden movement of the piston is reflected by the horn and pintle valve back to the piston, where it is reflected again toward the horn, thereby causing secondary, tertiary, and subsequent pressure rises, resulting in the additional irregular fuel injection.

According to the invention, the problem of secondary or subsequent injections is solved by the feature that the valve mechanism is made sufficiently yieldable to deliver the required quantity of fuel in response to the first pressure rise. More specifically, the control valve for closing the outlet of the injector is made in the form of a reed valve. The reed valve includes a valve plate secured to the injector body in close proximity of the piston actuated by the piezoelectric drive. The valve plate is provided with one or more outlet ports extending parallel to the direction of movement of the piston and being in a direct fluid communication with the pumping chamber defined in the injector body. The overall cross-sectional flow area of the outlet ports is selected so as to be sufficient to ensure that a substantially unobstructed flow of fuel is admitted from the pumping chamber through the outlet ports. The reed valve is completed by a generally flat, thin, resilient closure member in contact with a valve seat provided on the valve plate.

With this arrangement, the first or initial pressure wave produced in the fuel in the pumping chamber by sudden displacement of the piston upon actuation of the piezoelectric drive propagates substantially unobstructed through the outlet ports in the valve plate to reach the closure member, thereby causing the latter to readily give way to deliver a sufficient quantity of fuel. Thus, the energy of initial pressure wave is substantially completely consumed in the primary fuel injection, thereby preventing backward reflection of the pressure wave that would otherwise occur to induce secondary or tertiary injection when the flow rate of the primary injection is not sufficient.

Other features of the invention will become apparent when reading the following description in conjunction with the accompanying drawings.

DESCRIPTION OF THE PREFERRED EMBODIMENTS

Figure 1:
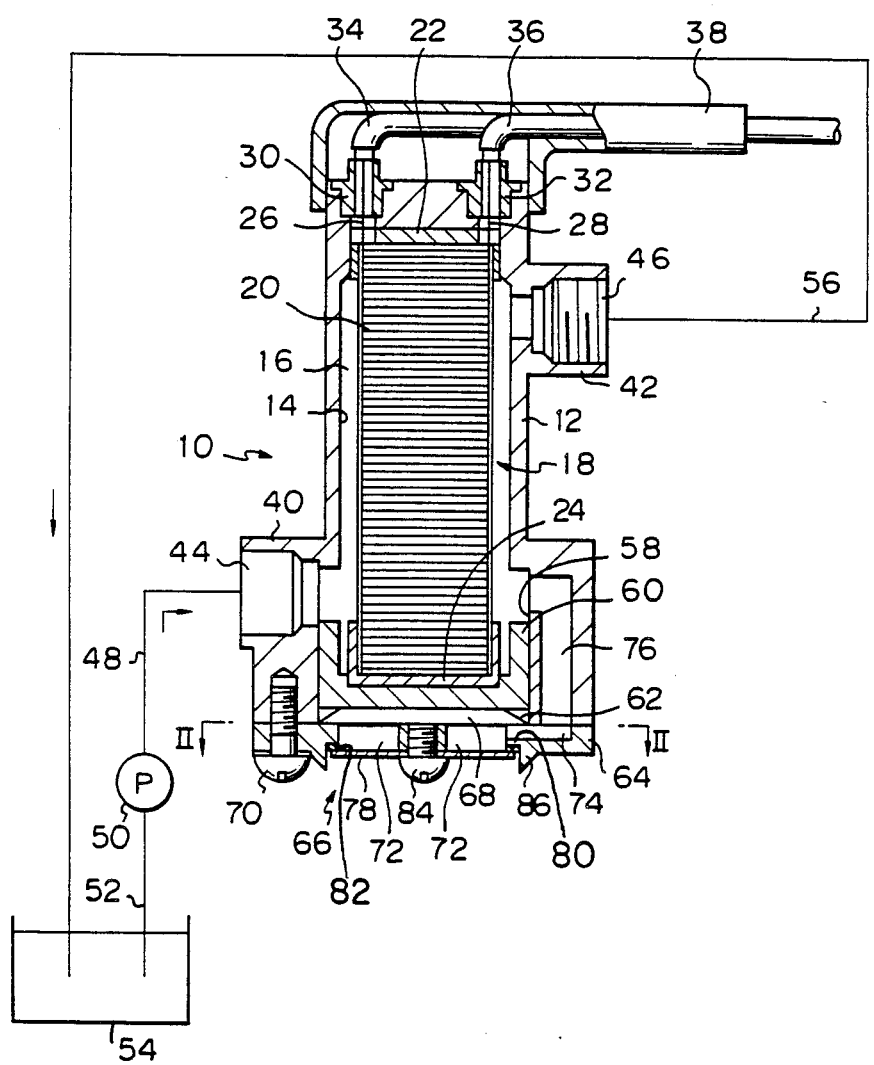
FIG. 1 is a side elevational view, partly in cross-section, of the fuel injector according to the present invention as connected to fuel feed and return lines.

Referring to the drawings, FIG. 1 illustrates a fuel injector according to the first embodiment of the invention. The injector 10 includes a roughly cylindrical injector body 12 having a stepped bore 14 open at the bottom end and defining an inner cavity 16. the injector body 12 is incorporated with a piezoelectric drive 18 including a column of piezoelectric element 20 received in the cavity 16 and sandwiched between cup-shaped upper and lower insulators 22 and 24. The column 20 includes a stack of piezoelectric discs each having a thickness, for example, of about 0.5 mm and made from a piezoelectric material such as lead zirconate titanate (PZT), the column including in total from several tens to around one hundred discs. The discs are compiled into the column with interleaved foil electrodes (not shown) sandwiched between consecutive discs. These foil electrodes are connected alternately to positive and negative terminals 26 and 28 so as to apply an electric field across respective piezoelectric discs to cause expansion and contraction of the column 20. Terminals 26 and 28 extend through the upper insulator 22, the top wall of the injector body 12, and mounting plugs 30 and 32 soldered or welded to the top wall and are connected respectively to positive and negative lead wires 34 and 36 25, fixed to the corresponding plugs 30 and 32. A rubber boot 38 is attached to the top of the injection body 12. The lead wires 34 and 36 may be suitably connected to a drive circuit (not shown) signalled by an electronic control unit comprising a computer.

The injector body 12 has integral inlet and outlet couplings 40 and 42 having, respectively, a fuel inlet 44 and a fuel outlet 46, both communicating with the inner cavity 16. The inlet 44 may be connected through a supply line 48 to a low-pressure feed pump 50 which, in turn, is connected through a suction line 52 to a fuel reservoir 54. The outlet 46 may be connected through a return line 56 to the reservoir 54.

The lower part of the stepped bore 14 is formed into a cylinder bore 58 in which a pumping piston 60 is slidably closely fitted. The piston 60 is biased upward by Belleville spring 62 seated on a valve plate 64 of the valve assembly 66. The lower surface of the piston 60, the cylinder bore 58, and the upper surface of the valve plate 64 form together a variable volume pumping chamber 68.

The valve plate 64 is rigidly secured to the lower end of the injector body 12 by means of screws 70 screwed into corresponding threaded bores in the body 12 in such a manner that the Belleville washer 62 is compressed and that the piezoelectric column 20 is preloaded at several tens of kilograms.

Figure 2:
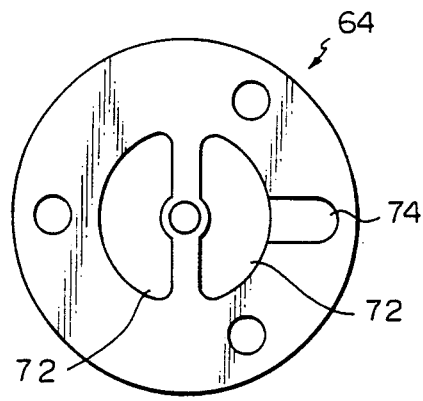
FIG. 2 is a plan view, taken along the line II—II of FIG. 1, of the valve plate.

As best shown in FIG. 2, the valve plate 64 has a pair of semicircular outlet ports 72 which are in direct fluid communication with the pumping chamber 68. The outlet ports are so sized that a substantially unobstructed path is provided for the pressure wave to propagate from the pumping chamber 68, as described later. The valve plate 64 is provided with a radial recess 74 which is open sideways to one of the ports 72. The recess 74 is connected to the inner cavity 16 through a passage 76 (FIG. 1) in the injector body 12 so that the low-pressure fuel pumped into the inner cavity 16 is then permitted to flow into the pumping chamber 68 on the suction stroke of the piston 60.

The valve assembly 66 is composed of the aforementioned valve plate 64 and a circular closure member 78 for closing and opening the outlet ports 72 of the valve plate. The valve plate 64 is provided at the lower surface with a circular valve seat 80 mating with the outer periphery of the closure member 78. Preferably, the valve seat 80 is provided with a thin annular layer of resilient material 82 such as oilproof rubber coated or attached thereto. The closure member 78 is made from a flat, thin resilient material such as spring steel sheet and is secured by a screw 84 to the valve plate 64 in such a manner that the outer periphery thereof is held in resilient contact with the rubber coating 82 of the valve seat 80, thereby closing the outlet ports 72. The thickness of the closure member may vary from 50 to 100 micrometers. The valve plate 64 is also provided at its lower surface with an annular projection 86 raised downward from and encircling the valve seat 80. This annular projection 86 serves as a mechanism for controlling the cone angle of the fuel sprayed between the valve seat 80 and the closure member 78.

The operation of the fuel injector is as follows. In use, the injector 10 is suitably mounted to a fuel injection system of a spark-ignition engine in such a manner that the valve assembly 66 is directed toward an intake air stream flowing into the engine cylinders. The fuel in the reservoir 54 is drawn into the feed pump 50 and is pressurized thereby at a pressure of about 0.3 atmospheric pressure (gauge pressure). The fuel under low pressure is then fed through the inlet 44 into the inner cavity 16 and flows therefrom through the passage 76 and recess 74 into the pumping chamber 68. The excessive amount of fuel is led through the outlet 46 and the return line 56 back to the reservoir 54. Thus, the inner cavity 16 as well as the pumping chamber 68 are filled with the low-pressure fuel.

When a voltage of, for example, plus 500 V is applied between the positive and negative lead wires 34 and 36, the piezoelectric column will suddenly expand axially for about 40 micrometers, causing the piston 60 to move against the action of the washer 62, thereby imparting a pressure wave or shock wave to the fuel in the pumping chamber 68. Since the valve plate 64 is positioned in close proximity with the lower face of the piston 60 in a face-to-face relationship therewith and because the outlet ports 72 in the valve plate 64 are so sized that an unobstructed flow path is formed between the pumping chamber 68 and the closure member 78, the pressure wave will propagate in the fuel in the outlet ports 72 and directly reach the closure member 78 thereby producing a pressure rise which causes the closure member 78 to resiliently yield to permit a small quantity of fuel to be released between the valve seat 80 and the circumferential periphery of the closure member. The injected fuel is directed downward by the annular projection 86. The cone angle of the sprayed fuel may be varied by changing the cross-sectional configuration of the projection 86. It will be noted that no check valve is provided between the inner cavity 16 and the passage 76 to prevent the fuel from flowing back to the inner cavity when the piston 60 moves on the pumping stroke. However, because the pumping stroke of the piston 60 is performed very rapidly in less than 100 microseconds and since recess 74 is opened sideways with respect to the pumping chamber 68 and the outlet ports 72, the pressure wave generated by the piston 60 will directly advance toward the closure member 78 without causing any substantial backflow through the passage 76.

The duration of voltage application may be varied from 300 microseconds to 1 millisecond. Fuel injection will terminate automatically when the pressure in the pumping chamber 68 drops. Subsequently, the piezoelectric drive 18 may be de-energized or a minus voltage applied allowing the piezoelectric column 20 to contract in the axial direction, whereby the piston 60 moves upward performing its suction stroke, in which a fresh amount of fuel is drawn into the pumping chamber 68, to complete one cycle of fuel injection.

The quantity of fuel injected per one cycle of injection may be varied by controlling the magnitude of voltage applied to the piezoelectric column. When the magnitude of applied voltage is constant, the quantity of fuel injected per unit time interval may be controlled by controlling the frequency of actuation of the piezoelectric drive 18, as disclosed in the copending U.S. patent application Ser. No. 549,372 assigned to the assignee of the present invention, the disclosure of which is incorporated by reference herein.

FIGS. 3 through 7 illustrates various embodiments of the valve assembly. These valve assemblies may be mounted to the injector body 12 in place of the valve assembly 66 of FIG. 1. Therefore, only the different structure will be described hereinafter.

Figure 3:
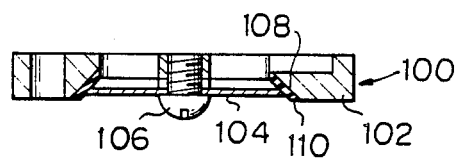
FIG. 3 is a cross-sectional view of the valve assembly according to the second embodiment.

In the embodiment shown in FIG. 3, the valve assembly 100 includes a valve plate 102 and a closure member 104 attached thereto by a screw 106. While, in the first embodiment, the valve seat 80 is made flat, the valve plate 102 is provided in this embodiment with a conical valve seat 108 flared outward. A layer 110 of rubber material is coated on or bonded to the valve seat 108 as in the first embodiment. This arrangement provides a wider cone angle of fuel spray as compared with the first embodiment.

Figure 4:
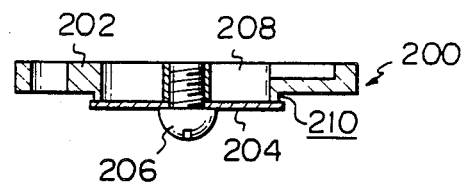
FIG. 4 is a cross-sectional view of the valve assembly according to the third embodiment.

FIG. 4 illustrates a third embodiment of the valve assembly. The valve assembly 200 again includes a valve plate 202 and a closure member 204 held together by a screw 206. In this embodiment, the valve plate 202 is provided with narrow annular projections 210 each extending along the contour of the respective outlet ports 208. A flat valve seat is formed at the lower end of each projection 210. The advantage of this embodiment is that the contact area between the valve seat and the closure member 204 is reduced so that the contact pressure per unit area is increased, thereby to increase the sealing pressure.

Figure 5:
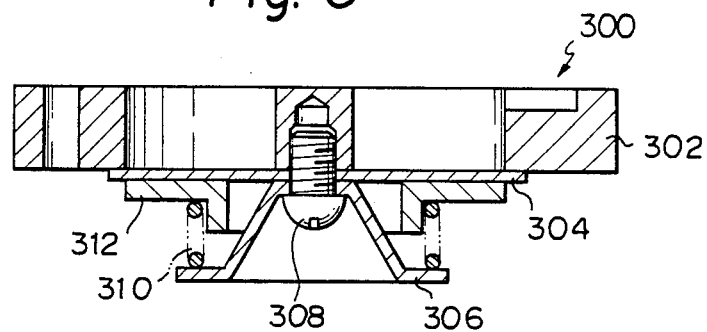
FIG. 5 is a cross-sectional view of the valve assembly according to the fourth embodiment.

FIG. 5 shows in a somewhat enlarged scale the fourth embodiment of the valve assembly. The valve assembly 300 includes a valve plate 302 similar to the valve plate 64 of the first embodiment. A similar closure member 304 and a spring retainer 306 are fastened to the valve plate 302 by a screw 308. A compression spring 310 bearing against the retainer 306 acts on a pressor disc 312 which actively urges the closure member 304 into engagement with the valve seat formed on the lower surface of the valve plate 302. The diameter of the pressor disc 312 is selected to be slightly smaller than that of the closure member 304. In this embodiment, the fuel pressure required to open the closure member 304 is dependent on the elasticity of the closure member 304 plus the spring force of the spring 310. The advantage of this embodiment is that adequate sealability of the closure member 304 is obtained without resort to the rubber coating 82 as in the first embodiment.

Figure 6:
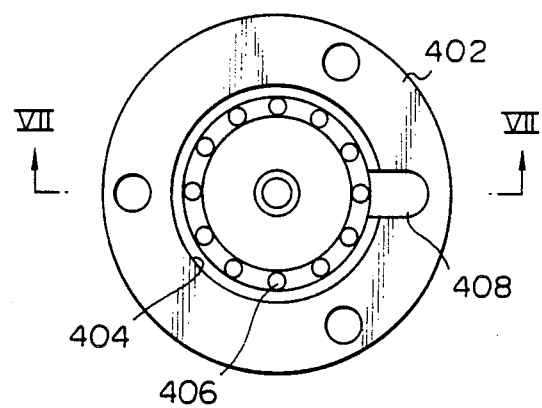
FIG. 6 is a plan view of the valve plate of the valve assembly according to the fifth embodiment.
Figure 7:
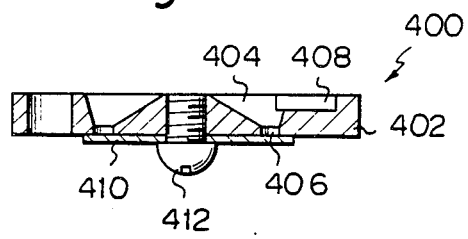
FIG. 7 is a cross-sectional view taken along the line VII—VII of FIG. 6.
Figure 8:
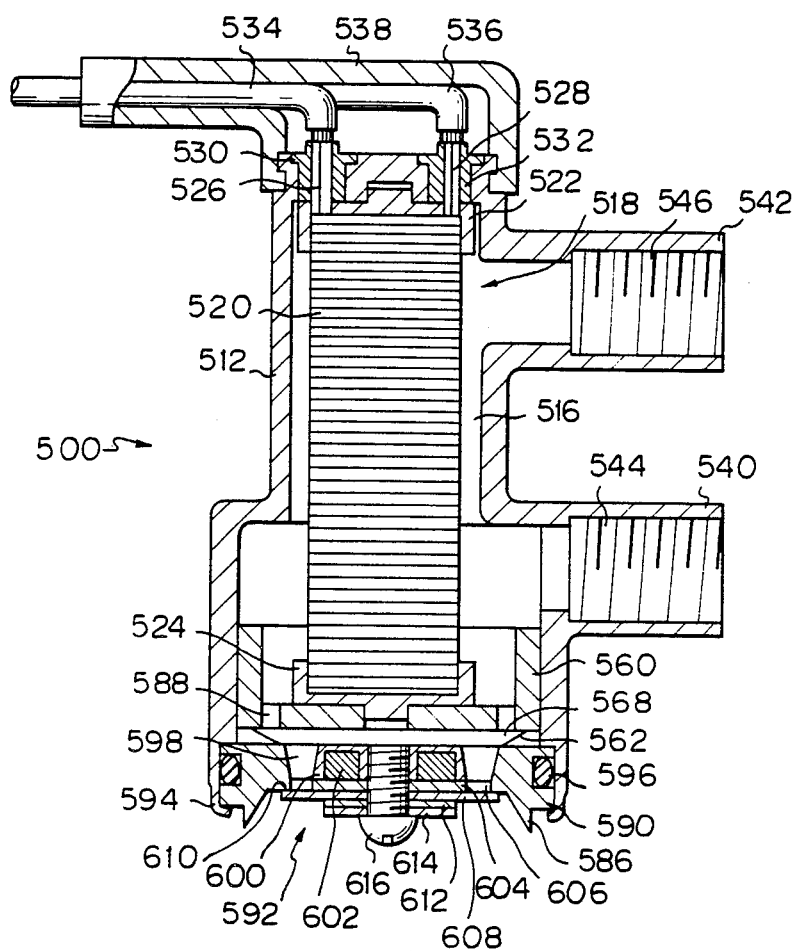
FIG. 8 is a side elevational view, partly in cross-sectional, of the fuel injector according to the sixth embodiment.

FIGS. 6 and 7 illustrate a fifth embodiment of the valve assembly. The valve assembly 400 comprises a valve plate 402 which has an annular groove 404. A plurality of spaced narrow outlet ports 406 are provided along the circle in registration with the bottom of the groove 404. As best shown in FIG. 7, the side walls of the groove 404 are tapered toward the bottom of the groove 404. A recess 408 similar to the recess 74 in the first embodiment opens into the groove 404. The valve assembly further includes a closure member 410 which is secured to the valve plate 402 by a screw 412. In the embodiment, the overall surface area of the outlet ports 406 is reduced as compared with the foregoing embodiments so that the closure member 410 is subjected to less fluid pressure. Thus, the sealability of the closure member 410 is improved. However, since the side walls of the groove 404 are tapered toward the outlet ports 406, the pressure wave produced by the piston will be converged toward the ports 406 in a manner sufficient to yield the closure member 410, FIG. 8 shows a sixth embodiment of the fuel injector. Parts and members equivalent to those shown in FIG. 1 are indicated by identical reference numerals prefixed by "5" and will not be described again. In this embodiment 500, the pumping chamber 568 is communicated with the inner cavity 516 of the injector body 512 by a plurality of narrow apertures 588 in the piston 560. The valve plate 590 of the valve assembly 592 is secured to the injector body by crimping the lower end 594 inwardly. An O-ring 596 is provided to seal the injector body 512 and the valve plate 590. In this embodiment, the valve plate 590 is made from a magnetically permeable non-magnetic material such as brass and is provided with a downwardly converging frustoconical central recess 598. A downwardly diverging frustoconical casing 600, preferably made from a ferromagnetic material, is placed centrally on the bottom of the recess 598. The casing 600 has an annular groove in which an annular segment of permanent magnet 602 is received. As in the embodiment shown in FIG. 7, the bottom wall 604 of the valve plate 590 is provided with a plurality of outlet ports 606 therethrough spaced apart along a circle. The annular space defined between the inclined inner wall of the valve plate 590 and the inclined outer wall of the casing 600 is tapered toward and communicated with the outlet ports 606. The valve assembly 592 also includes a circular closure member 608 similar to the closure member in the foregoing embodiments and cooperating with a valve seat 610 formed on the lower surface of the valve plate 590. The closure member 608 is made from a resilient ferromagnetic material such as spring steel. The casing 600, the valve plate 590, the closure member 608, a circular rubber cushion 612, and a circular back-up washer 614 are held together by a screw 616 screwed into a threaded central hole in the valve plate 590. The rubber cushion 612 backed up by the copper washer 614 serves to resiliently urge the closure member 608 against the valve seat 610 while allowing the closure member to readily flutter in response to high-frequency pressure waves generated by the piston 560. The diameter of the cushion 612 and 614 is selected so not to preclude fluttering movement of the closure member 608.

In this embodiment, a magnetic coupling is formed between the permanent magnet segment 602 and the closure member 608 so that the closure member 608 is attracted toward the associated valve seat 610 to snugly fit thereto. Thus, the sealability of the closure member 608 is increased so that it is possible to increase the fuel pressure applied by the feed pump to the fuel in the pumping chamber 568. The mode of operation of the fuel injector 500 is substantially the same as that described with reference to the preceding embodiments. In addition to or in place of the permanent magnet segment 602 positioned within the recess 598, an annular permanent magnet segment may be arranged within the portion of the valve plate 590 located radially outward of the circular array of the outlet ports 606 adjacent to and above the valve seat 610. Also, the valve seat 610 may be tapered as shown in FIG. 3.

Figure 9:
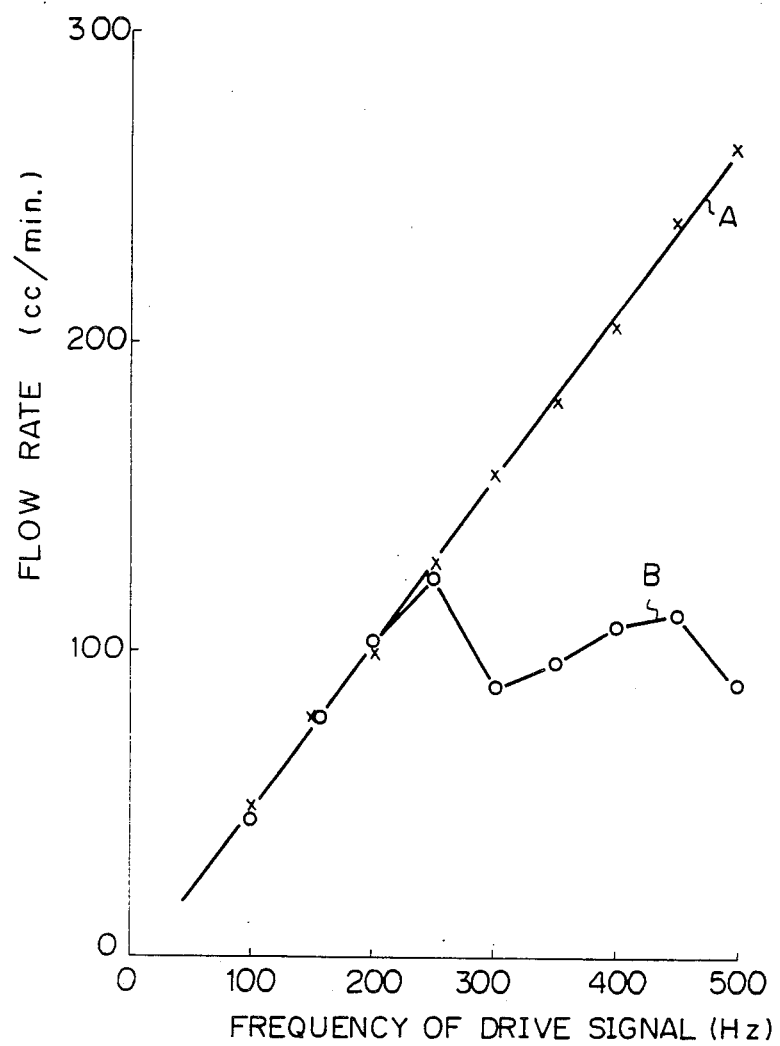
FIG. 9 is a graph showing the relationship between the flow rate and the frequency of actuation of the piezoelectric drive with respect to the fuel injector according to the present invention, in comparison with that of the conventional fuel injector.

FIG. 9 shows the results of comparative tests performed for the fuel injector according to the first embodiment of the invention and for the conventional fuel injector similar to that disclosed in U.S. Pat. No. 3,194,162. The vertical axis represents the flow rate of injected fuel and the horizontal axis indicates the frequency of drive signal applied to respective piezoelectric drives. The line A corresponds to the results obtained with the injector of the present invention and the line B indicates the results with the conventional injector having an outlet port in the order of 2 mm in diameter.

In the conventional injector, the cross-sectional flow area of the outlet port is so small that the required amount of fuel is not delivered during the first pressure rise, thereby causing second and subsequent injections. Furthermore, the relatively large mass of the pintle valve impeded high-frequency movement thereof. Therefore, as shown by the line B, the flow rate is not increased in proportion to the increase in the frequency of drive signals in the high-frequency range. Failure to obtain a linear relationship between the frequency and flow rate renders it impossible to control the quantity of injected fuel over the desired engine operational conditions.

In contrast, in the fuel injector according to the present invention, the valve assembly is designed and constructed so as to admit unobstructed propagation of the pressure waves. Moreover, the closure member is made readily flexural or yieldable. Due to extremely thin structure of the closure member, the mass thereof is minimized, thereby enabling high-frequency movement. Therefore, as shown by line A of FIG. 9, the flow rate is increased in response to an increase in the drive signal frequency with an extremely linear relationship.

Other advantages of the present invention are that atomization of fuel is improved due to high-frequency operation, that the injector is operable at a reduced fuel feed pressure, and that a valve assembly having a desired quality may be made at a low production cost due to its simplified structure.

While the present invention has been described herein with reference to the specific embodiments thereof, it is to be understood that the present invention is not limited thereby and various changes and modifications may be made thereto for those skilled in the art without departing from the scope of the inven- tion.

We claim:

1. In a piezoelectric low-pressure fuel injector for use in spray injecting a metered quantity of low-pressure fuel into an intake air stream flowing into the cylinder of a spark-ignition internal combustion engine, said fuel injector including an injector body having a fuel inlet and a pumping chamber communicated with said fuel inlet and open at an end, a pumping piston received movably in said pumping chamber, a piezoelectric drive housed in said injector body and operatively connected to said piston, and a normally closed output control valve positioned between the pumping chamber and the exterior of the injector body for closing the open end of the pumping chamber and operable to relase fuel therethrough under a predetermined fuel pressure, the improvements wherein said normally closed control valve comprises:

a valve plate secured to said injector body in a face-to-face relationship with and in close proximity with said piston, said valve plate having at least one outlet port extending therethrough in a direction parallel to the direction of movement of said piston in direct fluid communication with said pumping chamber, said valve plate having a valve seat at the exterior side thereof; and a generally flat thin, resilient disk-shaped closure member held in contact with and cooperating with said valve seat;

said outlet port having an overall cross-sectional flow area sufficient to allow a pressure wave produced in the fuel in said pumping chamber by sudden movement of the piston to propagate therethrough substantially unobstructed to reach said closure member;

said closure member being substantially free from preload in its normally closed state and being sufficiently yieldable to flex away from the cooperating valve seat in response to an initial pressure wave arriving thereon, thereby causing the fuel to be injected into the intake air stream in an amount substantially equal to volumetric displacement of the piston.

2. A fuel injector according to claim 1, wherein said closure member engages with said valve seat along a circumferential periphery thereof and wherein said closure menber has a diameter larger than one third of that of said piston.

3. A fuel injector according to claim 1, wherein said closure member is made from spring steel.

4. A fuel injector according to claim 1, further comprising means for controlling an angle of sprayed fuel, said means comprising an annular raised wall encircling an outer periphery of said closure rember, said raised wall terminating at a sharp edge defining an acute angle.

5. A fuel injector according to claim 1, wherein said valve seat presents a flat surface.

6. A fuel injector according to claim 1, wherein said valve seat presents an outwardly flared conical surface.

7. A fuel injector according to claim 1, wherein said valve seat is provided with a layer of resilient material.

8. A fuel injector according to claim 1, wherein said valve seat is formed on a narrow annular projection extending adjacent to and along a circumferential periphery of the closure member.

9. A fuel injector according to claim 1, wherein said valve plate has a plurality of spaced outlet ports arranged along a circle and wherein said valve plate is provided at a side thereof facing said pumping chamber with an annular groove tapering toward said outlet ports, said annular groove being defined by inclined inner and outer side walls, an angle of inclination of said outer wall being larger than an angle of inclination of said inner wall.

10. A fuel injector according to claim 1, wherein said closure member is made from a ferromagnetic material and wherein said injector further comprises means for magnetically attracting said closure member against said valve plate.

11. A fuel injector according to claim 10, wherein said magnetic attracting means comprises a permanent magnet segment secured to the valve plate at a side thereof opposite the closure member.

12. A fuel injector according to claim 11, wherein said permanent magnet segment is housed within a casing attached to the valve plate in such a manner that said permanent magnet segment is isolated from the fuel flowing through said outlet port.

13. A fuel injector according to claim 12, wherein said valve plate is made from a magnetically permeable, non-magnetic material.

14. A fuel injector according to claim 13, wherein said magnet casing is made from a ferromagnetic material to increase magnetic coupling between said permanent magnet segment and closure member.

15. A piezoelectric low-pressure fuel injector for use in spray injecting a metered quantity of low-pressure fuel into an intake air stream drawn into the cylinder of an internal combustion engine, said fuel injector comprising;

an injector body having a vertically extending axial bore closed at its upper end and open at its lower end, said bore defining an inner cavity in said injector body, said body further having a fuel inlet for admitting low-pressure fuel into said inner cavity and a fuel outlet for draining excessive fuel therefrom, said fuel outlet being positioned at a higher level than said fuel inlet;

a pumping piston received movably in a lower part of said bore;

piezoelectric drive means received in said inner cavity for reciprocating said piston at a high frequency;

a disk-shaped valve plate fastened to a lower end of said injector body in a face-to-face relationship with and in close proximity to the piston, said valve plate and injector body and pumping piston defining a pumping chamber therebetween, said valve plate having at least one outlet port extending therethrough in a direction parallel to the direction of movement of said piston in direct fluid communication with said pumping chamber, said valve plate having a valve seat at a lower side thereof, said outlet port having a cross-sectional flow area sufficient to allow a pressure wave produced in the fuel in said pumping chamber by sudden movement of the piston to propagate therethrough substantially unobstructed;

a thin disk-shaped closure member held in contact with and cooperating with said valve seat, said closure member being substantially free from preload in its closed condition and being sufficiently yieldable to flex away from the associated valve seat in response to an initial pressure wave arriving thereon to inject the fuel in an amount substantially equal to volumetric displacement of the piston; and passage means for communicating said inner cavity with said pumping chamber, said passage means opening sideways into said pumping chamber to prevent release of the pressure wave through said passage means back to the inner cavity.

16. A piezoelectric low-pressure fuel injector for spray injecting a metered quantity of low-pressure fuel into an intake air stream drawn into the cylinder of an internal combustion engine, said fuel injector comprising:

an injector body having a vertically extending axial bore closed at an upper end thereof and open at a lower end thereof, said bore defining an inner cavity in said injector body, said injector body further including a fuel inlet for admitting a low-pressure fuel into said cavity and a fuel outlet for draining excessive fuel therefrom, said fuel outlet being located at a higher level than said fuel inlet;

a pumping piston received movably in a lower part of said bore;

piezoelectric drive means received in said inner cavity for reciprocating said piston at a high frequency;

a disk-shaped valve plate secured to a lower end of the injector body in a face-to-face relationship with and in close proximity to the pumping piston, said valve plate and injector body and pumping piston defining a pumping chamber therebetween, said valve plate having a plurality of circumferentially spaced outlet ports arranged in a circle and extending therethrough in a direction parallel to the direction of movement of said piston in direct fluid communication with the pumping chamber, said valve plate having a valve seat at a lower side thereof, said outlet ports having an overall cross-sectional flow area sufficient to allow a pressure wave produced in the fuel in the pumping chamber by sudden movement of the piston to propagate therethrough substantially unobstructed, said valve plate being further provided at an upper side thereof with an annular groove tapering toward said outlet ports;

a thin disk-shaped closure member held in contact with and cooperating with said valve seat, said closure member being substantially free from preload at its closed condition and being sufficiently yieldable to flex away from its cooperating valve seat in response to an initial pressure wave arriving thereon to permit the fuel to be injected therethrough in an amount substantially equal to volumetric displacement of the piston; and passage means provided in said pumping piston for communicating said inner cavity with said pumping chamber.

17. A fuel injector according to claim 16, wherein said passage means comprises a plurality of circumferentially spaced apertures arranged in a circle, said apertures being staggered radially with respect to said annular groove.

* * * * *